Sept. 20, 1955 M. H. SHIPPEN 2,718,335
MULTIPLE DISPENSER
Filed Feb. 19, 1953 3 Sheets-Sheet 1

Mary H. Shippen
INVENTOR.

BY *Clarence A. O'Brien*
*and Harvey B. Jackson*
Attorneys

Sept. 20, 1955  M. H. SHIPPEN  2,718,335
MULTIPLE DISPENSER
Filed Feb. 19, 1953  3 Sheets-Sheet 2
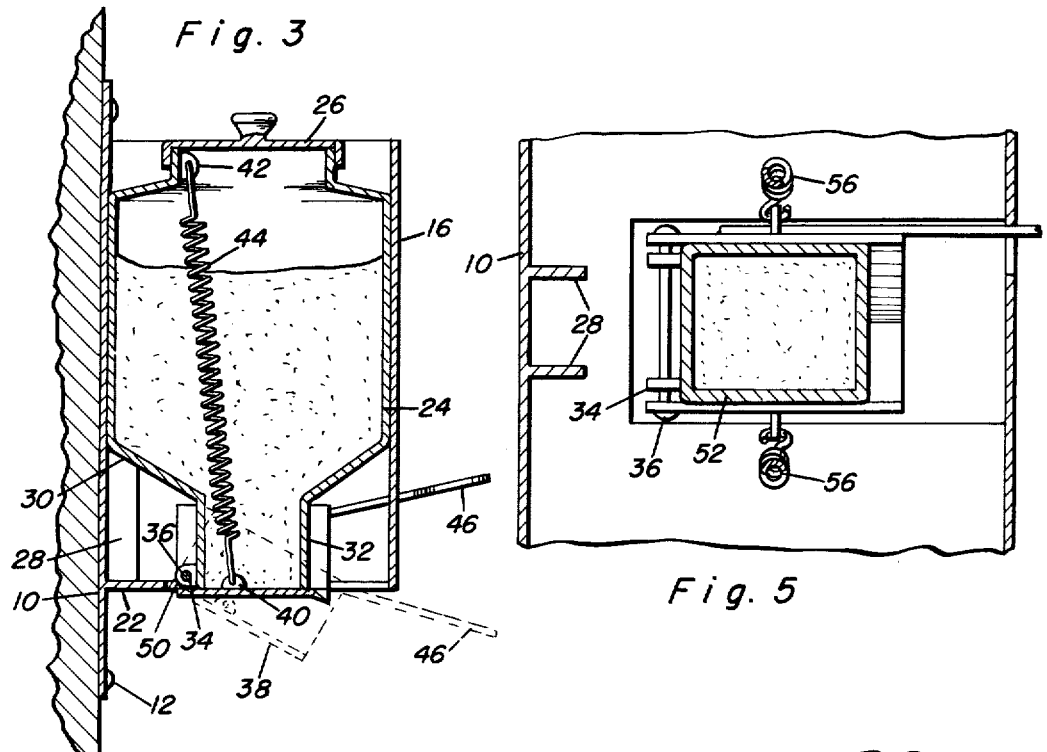
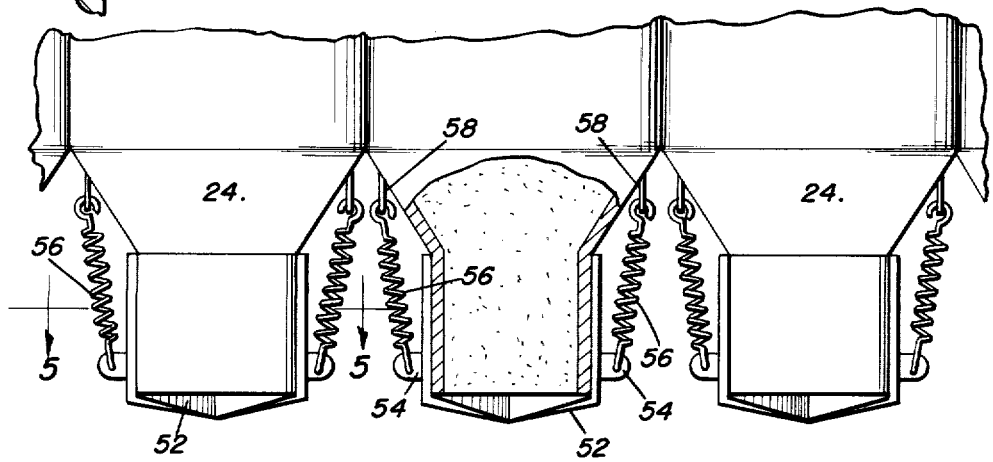
Mary H. Shippen
INVENTOR.

Sept. 20, 1955 M. H. SHIPPEN 2,718,335
MULTIPLE DISPENSER
Filed Feb. 19, 1953 3 Sheets-Sheet 3
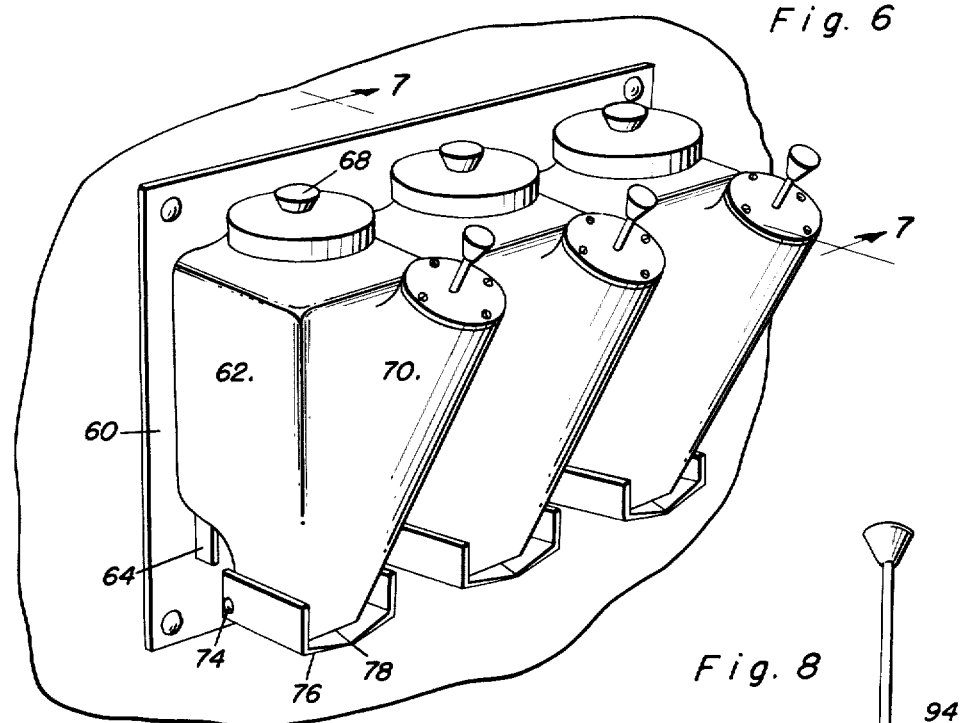
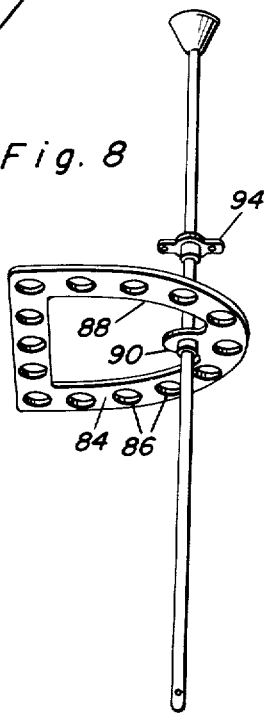
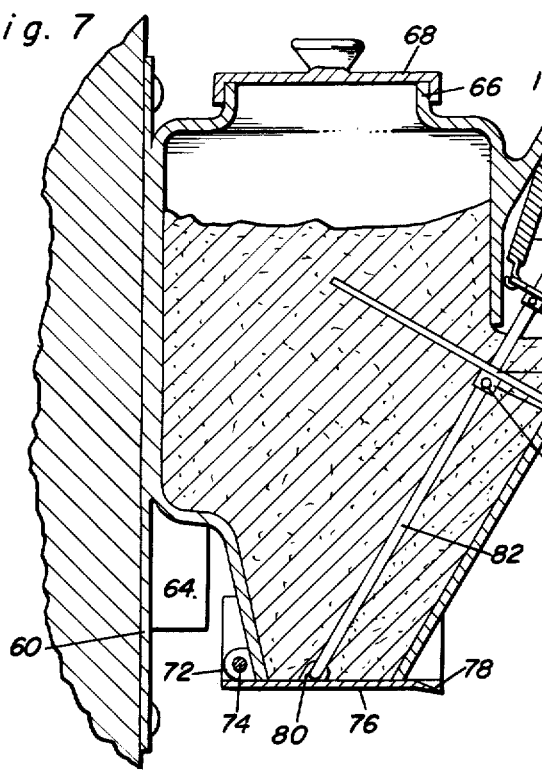
Mary H. Shippen
INVENTOR.
BY Clarence A. O'Brien
and Harvey B. Jacobson
Attorneys United States Patent Office 2,718,335
Patented Sept. 20, 1955

2,718,335
MULTIPLE DISPENSER
Mary H. Shippen, Lost Springs, Wyo.

Application February 19, 1953, Serial No. 337,778

4 Claims. (Cl. 222—135)

This invention relates to a kitchen appliance, and more particularly to a dispenser capable of being used for storage and dispensing of a number of staple foodstuffs such as flour, salt, pepper, sugar, coffee, and the like.

The primary object of this invention resides in the provision of a device which will enable the user to store a quantity of various foodstuffs in a highly sanitary manner, the device also providing easily actuated means for dispensing such foodstuffs.

In restaurants, dining halls, and in the home it is often necessary to fill and refill sugar bowls, salt shakers and pepper cellars, and the like and this invention provides means to insure that the desired amount of condiment will be metered to its receptacle in a sanitary manner.

Still further advantages of the various forms of this invention reside in the provision of a device which employs means for insuring that the foods or spices positioned in the dispenser will be positively discharged even though the humidity has affected the contents of the dispenser so as to cake the substance contained therein. Additionally, positive means for insuring against accidental discharge of the contents of the containers is provided. Other additional objects reside in the provision of a multiple dispenser that is strong and durable, simple in construction and manufacture, capable of being manufactured out of readily available materials such as wood, or synthetic plastic materials, and which is highly pleasing in appearance.

Other features and advantages will become more readily apparent from the following description and the accompanying illustrative drawings in which:

Figure 3 is a vertical sectional view as taken along the plane of line 3—3 in Figure 2 showing in particular the construction of the means used for holding the closure plates of this multiple dispenser in a closed position;

Figure 4 is a side elevational view of a portion of an alternative form of multiple dispensers with parts thereof being shown in section for greater detail;

Figure 5 is a horizontal sectional view as taken along the plane of line 5—5 in Figure 4;

Figure 6 is a perspective view of a further modification of this invention which employs means for separating caked material within the individual containers of this multiple dispenser;

Figure 7 is a sectional detail view as taken along the plane of line 7—7 in Figure 6; and, Figure 8 is a perspective view of the sifting plate and push rod for actuating the sifting plate and the closure plate comprising important elements of this invention.

Figure 1:
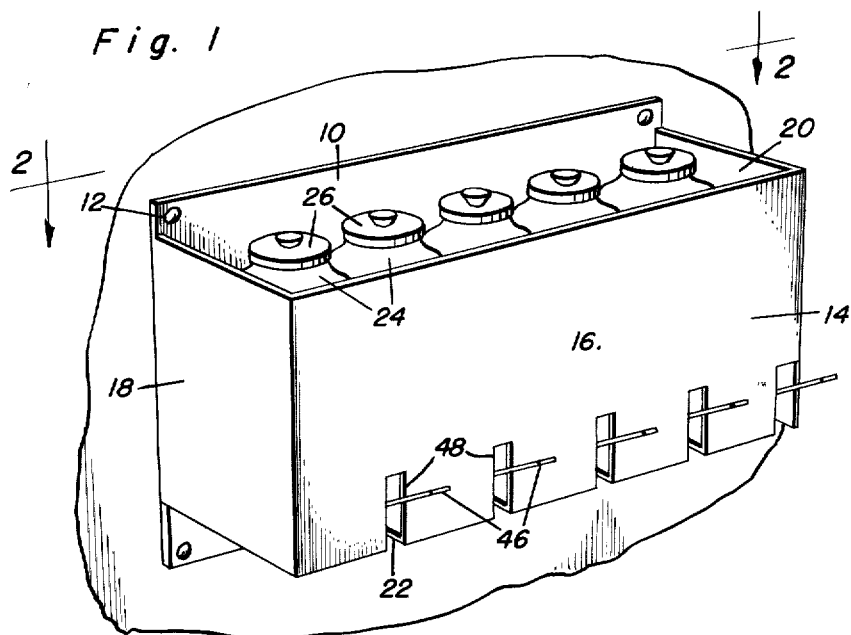
Figure 1 is a perspective view of a multiple dispenser constructed in accordance with the present invention.
Figure 2:
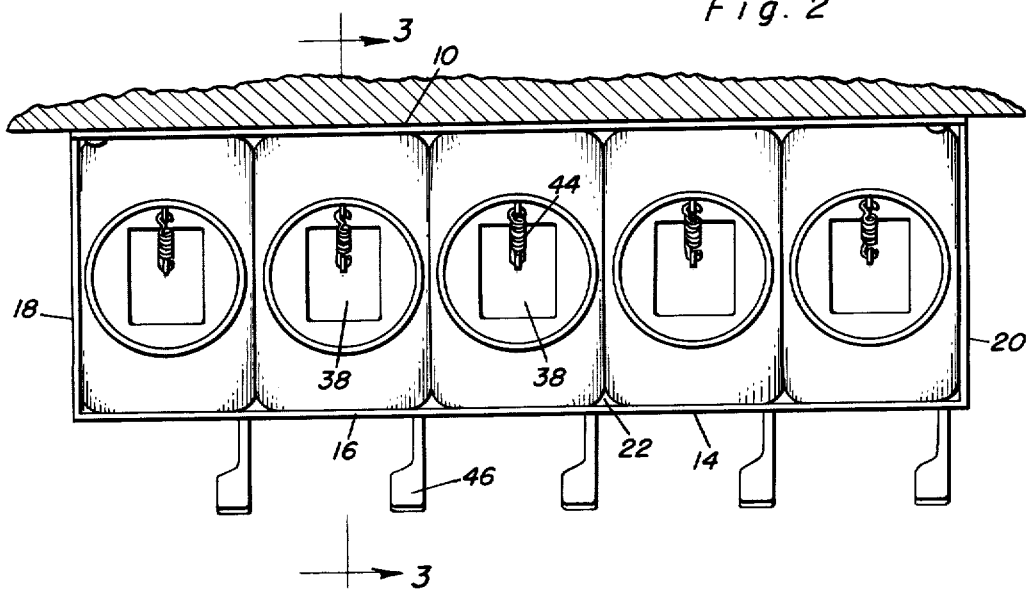
Figure 2 is a top plan view of this device with the covers of the containers removed as taken along the plane of line 2—2 in Figure 1.

With continuing reference to the accompanying drawings wherein like reference numerals designate similar parts throughout the various views, and with initial attention to Figures 1–3, it will be noted that herein there is provided a support including a back plate 10 which may be secured by nails, screws, or other fasteners 12 to any vertical surface in a kitchen or other location as may be desired. The support further includes a substantially U-shaped casing 14 including a front wall 16, side walls 18 and 20, and a perforated bottom wall 22. Receivable within the casing between the front wall 16 and the rear wall 10 are a number of jars or containers 24. Each of these containers may be provided with a removable cover 26 and are preferably formed with flat sides so that they may be nested securely together.

The containers 24 are adapted to contain and receive foodstuffs such as salt, sugar, pepper, flour, coffee, tea or the like. Supporting ribs 28 having the upper surface 30 thereof conforming to the configuration of the container 24 are provided for supporting the containers since the bottom wall 22 is apertured and would otherwise permit the necks 32 of the containers to pass therethrough. The containers are open at the bottom thereof and are provided with ears 34 within which a pin 36 pivotally mounts a closure plate 38. Each of the closure plates 38 may be box-shape in configuration and have lugs 40 attached to the inner bottom surface thereof. Terminally connected to the lugs 40 and to other lugs 42 secured to the inner walls of the container 24 adjacent the top thereof are coil springs 44 which continuously urge the closure plate 38 upwardly to prevent discharge of the contents of the container 24. There is attached to the sides of the closure plates 38 operating handles 46 which extend through slots 48 formed in the front wall 16 and the bottom wall 22 of the casing.

The containers may be filled with a substantial amount of the substance desired. Then, when it is desired to use a portion of the substance it is merely necessary to press downward upon the actuating lever 46. This will rotate the closure plate 38 downwardly to form a chute for delivery of the substance to any container within which it is desired to place the substance. Upon release of the actuating handle or lever 46 the spring 44 will urge the closure plate 38 upwardly to prevent further discharge of the substance within the container. When it is desired to remove an entire container 24 from the casing, it is merely necessary to depress fully the actuating lever 46 so that the actuating lever 46 may pass through the apertures 50 in the bottom wall 22 and through the slot 48.

Referring now to the embodiment of the invention as is shown in Figures 4 and 5, it will be seen that herein the device is quite similar to that shown in Figures 1–3 with the exception of the fact that the closure plate 52 in this form of the invention is provided with ears 54 on either side thereof to which are attached coil springs 56 which are also attached to ears or lugs 58 attached to the outer side walls of the container 24. This form of the invention therefore permits the springs 56 to be maintained entirely without the container 24. When these jars are employed with a corrosive foodstuff such as salt, these springs 44 of the form of the invention as shown in Figures 1–3 would obviously tend to become corroded. Therefore, the form of the invention as is shown in Figures 4 and 5 is desirable. However, the springs 44 will perform the function of breaking up some of the caking that may take place within the containers were they subjected to a humid atmosphere for a considerable period period of time.

Referring now to the embodiment of the invention as is illustrated in Figures 6–8, it will be seen that herein the device consists of a support 60 having preferably integrally molded therewith a plurality of containers 62. Reinforcing support ribs 64 may be integrally formed with the support plates 60 and are used for supporting and strengthening the entire assembly. The containers 62 are provided with an open upper neck portion 66 which is closed by a cover 68 of suitable configuration. An angularly outwardly projecting cylindrical portion 70 is integrally formed with the containers 62 and directly communicates with the open bottom of the containers 62. Adjacent the bottom of the containers 62 are added ears 72 in which a pin 74 is carried, the pin being also engaged in the substantially U-shaped closure plate 76. As can be best seen in the drawings illustrating this modification of the invention the closure plates 76 are provided with a pouring spout 78. It is to be understood that the closure plates 38 and 52 as described in the foregoing are likewise of similar configuration, if desired, to the closure plates 76. Hooked in a lug 80 or otherwise pivotally attached to the closure plates 76 is a push rod 82 which carries a separating plate 84 having a plurality of apertures 86 extending about the periphery thereof and having a rather large aperture 88 formed therein. The apertures 86 and 88 eliminate more than one-half of the area of the entire separating plate 84 so as to permit ready passage of the separating plate therethrough while insuring that it will break up any lumps or caking of the substance in the container 62. A sleeve 90 may be integrally formed with the pressure plate 84 and a set screw 92 may be used to secure the pressure plate 84 in position. A bracket 94 is secured on the push rod 82 and coil springs 96 are attached to the bracket 94 and to lugs 98 within the cylindrical portion 72 adjacent its upper portion 70. A cover plate 100 is held in place by screws 102 or other fasteners so as to prevent any of the contents of the container 62 from being inadvertently discharged.

Upon pressing the push rod 82 downwardly the closure plate 76 will be pivoted thus permitting the contents to be discharged. Inasmuch as the separating plate 84 will break up any lumps of the material in the container the flow of the substance will be assured. The separating plate applies pressure over a large area though the apertures 86 and 88 therein decrease the amount of force necessary to move the push rod 82.

Since from the foregoing, the construction and advantages of these multiple dispensers are readily apparent, further description is believed to be unnecessary.

However, since numerous modifications will readily occur to those skilled in the art after a consideration of the foregoing specification and accompanying drawings, it is not intended to limit the invention to the precise embodiments shown and described, but all suitable modifications and equivalents may be readily resorted to as desired.

What is claimed as new is as follows:

1. A multiple dispenser comprising a support, a plurality of containers carried by said support, said containers having discharge openings in the bottom thereof and having upwardly and outwardly extending cylindrical portions, closure plates pivotally secured to said containers for closing said discharge openings, and resilient means attached to said containers and said closure plates for holding said closure plates in a closed position, said resilient means extending within said cylindrical portions and including push rods pivotally attached to said closure plates for opening said closure plates, a separating plate attached to said push rod, a bracket secured to said push rod, said resilient means being secured to said bracket and said container.

2. A multiple dispenser comprising a support, a plurality of containers carried by said support, said containers having discharge openings in the bottom thereof and having upwardly and outwardly extending cylindrical portions, closure plates pivotally secured to said containers for closing said discharge openings, and resilient means attached to said containers and said closure plates for holding said closure plates in a closed position, said resilient means extending within said cylindrical portions and including push rods pivotally attached to said closure plates for opening said closure plates, a separating plate attached to said push rod, a bracket secured to said push rod, said resilient means being secured to said bracket and said container, said separating plate having a plurality of apertures therethrough, the apertures in said separating plate comprising more than half of the area of said separating plate.

3. A multiple dispenser comprising a support, a plurality of containers carried by said support, said containers having discharge openings in the bottom thereof and having upwardly and outwardly extending cylindrical portions, closure plates pivotally secured to said containers for closing said discharge openings, and resilient means attached to said containers and said closure plates for holding said closure plates in a closed position, said containers being integrally formed with said support, said resilient means extending within said cylindrical portions and including push rods pivotally attached to said closure plates for opening said closure plates, a separating plate attached to said push rod, a bracket secured to said push rod, said resilient means being secured to said bracket and said container, said separating plate having a plurality of apertures therethrough, the apertures in said separating plate comprising more than half of the area of said separating plate.

4. A multiple dispenser comprising a support, a plurality of containers carried by said support, said containers having discharge openings in the bottom thereof and having upwardly and outwardly extending cylindrical portions, closure plates pivotally secured to said containers for closing said discharge openings, and resilient means attached to said containers and said closure plates for holding said closure plates in a closed position, said resilient means extending within said cylindrical portions and including push rods pivotally attached to said closure plates for opening said closure plates, a separating plate attached to said push rod, a bracket secured to said push rod, said resilient means being secured to said bracket and said container, said closure plates being substantially U-shaped and having a pouring spout.

References Cited in the file of this patent

UNITED STATES PATENTS

| Number | Name | Date |
|---|---|---|
| 513,803 | Luster | Jan. 30, 1894 |
| 847,458 | Beham | Mar. 19, 1907 |
| 1,216,135 | Keim | Feb. 13, 1917 |
| 1,659,772 | Hanson | Feb. 21, 1928 |